Sept. 4, 1928.
L. R. SMITH
METHOD OF MAKING PIPE COUPLINGS
Filed July 15, 1927
1,682,996
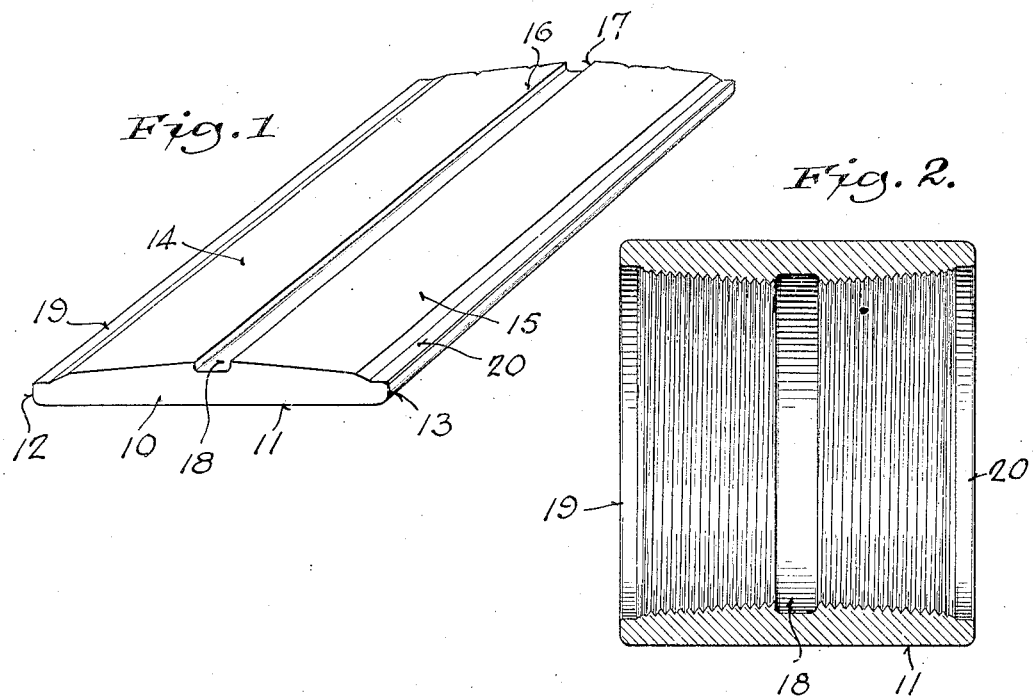
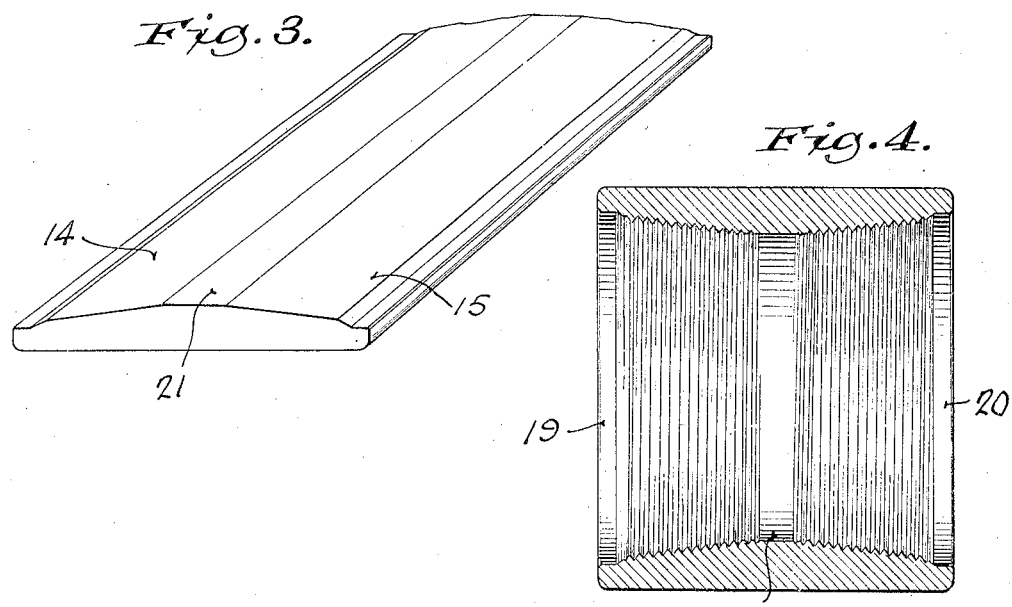
INVENTOR:
L. R. SMITH
WITNESS:
BY
ATTORNEYS.

Patented Sept. 4, 1928.

1,682,996

UNITED STATES PATENT OFFICE.

LLOYD RAYMOND SMITH, OF MILWAUKEE, WISCONSIN, ASSIGNOR TO A. O. SMITH CORPORATION, OF MILWAUKEE, WISCONSIN, A CORPORATION OF NEW YORK.

METHOD OF MAKING PIPE COUPLINGS.

Application filed July 15, 1927. Serial No. 205,964.

The present invention relates to a pipe coupling designed primarily for use in connecting sections of pipe of large diameter, such as are used in deep oil wells.

It resides in a pipe coupling made from a rolled metal bar of special cross-section, which, when converted into the form of a tube with the ends of the bar abutting and welded in the line of their meeting ends, produces a pipe coupling having an opening tapering from each end to a transverse constriction at the middle thereof. By so constructing the coupling, the older operations of boring-out the ends of a coupling made from a metal bar of rectangular cross-section to produce the tapering openings are eliminated, and production is increased at a greatly lessened cost. This elimination of the operations of boring-out, enables the threads to be cut directly into the mill-finished surface of the metal, which is improved and refined in the rolling operations, permitting a superior threading of the coupling to be effected.

In such a coupling, the specially rolled metal bar used in its production is in the general or substantial form of a pentagon, in cross-section, with the oppositely sloped surfaces of one of its broader sides extending laterally from a central ridge which runs longitudinally of the sloped side of the bar, the constriction before mentioned being formed by the ridge, when the bar is bent into annular form.

The coupling just described is set forth and claimed in an application filed December 20, 1922, by Richard Stresau and Harry Woodhead, Serial No. 608,111, on which Letters Patent No. 1,637,318, were granted July 26, 1927. The present invention in couplings resides in an improvement of the coupling covered by the said Letters Patent, and embodies a construction in which the longitudinal ridge is omitted from the bar from which the coupling is made, and is replaced by a clearance into which the threading taps or chasers move at the end of their threading operation, for a purpose which will hereinafter be set forth.

The novelty residing in the invention will be pointed out in the appended claims.

In the accompanying drawings:

Figure 1 is a perspective view showing a metal bar, specially rolled so as to provide, among other features, opposite slopes upon one of its broader sides, and a longitudinally extending centrally disposed groove or depression, to provide a thread clearance.

Fig. 2 is a vertical longitudinal sectional view through a pipe coupling formed from the bar shown in Fig. 1.

Fig. 3 is a view similar to Fig. 1, showing another specially rolled metal bar provided with a modified form of clearance for the threading taps or chasers.

Fig. 4 is a view similar to Fig. 2, showing a section of a coupling formed from the bar shown in Fig. 3.

Prior to the patented invention and the present improvement thereon, it was customary to make pipe couplings by bending a bar rectangular in cross-section into an annulus, and weld the over-lapping meeting ends to complete the ring. Both ends were then bored out to produce the desired tapers, the tapers meeting at the middle of the coupling, where a central, circumferential, interior ridge or constriction was formed. The coupling was then tapped from each end, but usually the threads did not register where they came together at the central ridge, and this was regarded as a defect. By the employment of complicated and costly later devised machines, it was possible to produce a thread which was continuous, over the central constriction, from one end of the coupling to the other, and so obviate the defect. The machines used for this purpose were required to operate with the utmost precision in order to attain perfect results.

But I have found that the continuous and unbroken interior threading of the coupling is not indispensable in the production of an entirely satisfactory and acceptable coupling of the same type, and in the present invention have improved the patented coupling in such manner that a thread clearance in lieu of the ridge is provided at the middle diameter of the coupling, whereby the coupling may be threaded from each end. Such threads terminate in the clearance, and each thread is perfect throughout its whole course, instead of being broken and ragged where the two threads formerly came together at the central ridge or constriction.

The drawing illustrates two equivalent forms in which my invention has been embodied specifically.

Fig. 1 shows a specially rolled bar of steel of such composition as to meet the specifications of the American Petroleum Institute. The bar 10 is substantially pentagonal in cross-section, it having a bottom side 11, two edges 12 and 13, and a top side, the latter presenting two surfaces 14 and 15, which latter slope toward the edges 12 and 13 from spaced lines 16 and 17, located near the longitudinal center of the bar. Between the spaced lines 16 and 17, a groove or depression 18 is produced in rolling the bar, and in the same operation, marginal recesses 19 and 20 are formed at the juncture of the sides 12, 13, and the sloping surfaces 14, 15, respectively, the marginal recesses being provided for purposes well known in the art.

A section of the bar 10, having a length proportioned to the diameter of the coupling to be produced, is rolled or bent into an annulus, with the ends of the bar abutting and the side with the sloped surfaces upon the inside. The meeting ends are then welded, preferably by butt welding electrically, to constitute an integral structure having an opening which tapers from each end to the central groove or depression.

In rolling the bar 10 of special cross-section, the oppositely sloping surfaces 14 and 15 are formed by the rolls of the mill, and the metal of such surfaces is greatly refined and improved, presenting much better surfaces for threading than exists in the older form of couplings, in the manufacture of which the mill surface is bored out, and less refined metal surfaces are presented for threading.

In threading the tapering openings of the coupling, the taps or chasers operate over the tapered surfaces, and at the end of their cutting traverse run into the open clearance provided in the groove or depression 18, and so produce in each end of the coupling a perfect thread running between the points of starting and ending. The thread at one end of the coupling may therefore be without definite location with respect to the thread at the other end. After threading at one end, the coupling may be again chucked for threading the other end. This may be done at random and without regard to location of the thread previously cut.

Fig. 3 shows a specially rolled bar of the same characteristics and cross-sectional formation as that shown and described in connection with Fig. 1, except as to the formation of the thread clearance, and may be produced by the same rolls by removing the roll which forms the groove or depression 18, so as to leave on the sloped face of the bar a flat band or surface 21, parallel to and separating the oppositely sloping surfaces 14 and 15. In threading the coupling formed from the bar shown in Fig. 3, the taps or chasers at the end of their cutting traverse will enter a clearance 21, which is sufficient to prevent conflict of the separate threads.

Figs. 2 and 4 exemplify the couplings produced from the bars shown in Figs. 1 and 3, respectively.

Having thus described my invention, what I claim and desire to secure by Letters Patent of the United States, is:

1. The method of making a pipe coupling which consists in forming a metal bar with an intermediate, longitudinally extending tap clearance and surfaces sloping oppositely therefrom on one of its broader sides, converting the said bar into a tube with the said side upon its interior and the ends of the bar abutting, and welding the meeting ends of the bar to constitute an integral tubular structure having inwardly tapering openings which terminate at the tap clearance.

2. The method of making a pipe coupling which consists in forming a metal bar with an intermediate, longitudinally extending tap clearance and surfaces sloping oppositely therefrom on one of its broader sides, converting the said bar into a tube with the said side upon its interior and the ends of the bar abutting, welding the meeting ends of the bar to constitute an integral tubular structure having inwardly tapering openings, and providing the said tapering openings with threads which terminate at the tap clearance.

3. The method of making a pipe coupling which consists in forming a metal bar with longitudinally extending surfaces on one of its broader sides sloping oppositely toward the edges of the strip and with a groove or depression between the said sloping surfaces for tap clearance, converting the said bar into a tube with the ends of the bar abutting and the sloped surfaces and groove upon its interior, welding the meeting ends of the bar to constitute an integral tubular structure having inwardly tapering openings, and providing the said tapering openings with threads which terminate at the tap clearance.

In testimony whereof I have signed my name at Milwaukee, this 12th day of July, 1927.

L. R. SMITH.